United States Patent
Cornwell et al.

(10) Patent No.: US 8,770,168 B2
(45) Date of Patent: Jul. 8, 2014

(54) DIRECT INJECTION DIESEL ENGINES

(75) Inventors: Richard Cornwell, Henfield (GB); Fabrizio Conicella, Turin (IT)

(73) Assignee: Ricardo UK Limited, West Sussex (GB)

( * ) Notice: Subject to any disclaimer, the term of this patent is extended or adjusted under 35 U.S.C. 154(b) by 0 days.

(21) Appl. No.: 13/575,792

(22) PCT Filed: Jan. 26, 2011

(86) PCT No.: PCT/GB2011/000095
§ 371 (c)(1),
(2), (4) Date: Oct. 22, 2012

(87) PCT Pub. No.: WO2011/092459
PCT Pub. Date: Aug. 4, 2011

(65) Prior Publication Data
US 2013/0036998 A1    Feb. 14, 2013

(30) Foreign Application Priority Data
Jan. 29, 2010   (GB) .................................. 1001562.6

(51) Int. Cl.
*F02F 3/26*    (2006.01)

(52) U.S. Cl.
USPC ......... 123/193.6; 123/306; 123/307; 123/663

(58) Field of Classification Search
USPC ............. 123/193.1, 193.4, 193.6, 197.2, 306, 123/307, 298, 301, 302, 662, 663; 29/888.04
See application file for complete search history.

(56) References Cited

U.S. PATENT DOCUMENTS 5,943,993 A * 8/1999 Carstensen et al. ........... 123/298
6,691,670 B1 * 2/2004 Gatellier et al. .............. 123/298

(Continued)

FOREIGN PATENT DOCUMENTS

AT  380 311 B   5/1986
CN  201074556 Y  6/2008

(Continued)

OTHER PUBLICATIONS

International Search Report from PCT/GB2011/000095 dated May 31, 2011 (3 pages).

(Continued)

*Primary Examiner* — Lindsay Low
*Assistant Examiner* — Grant Moubry
(74) *Attorney, Agent, or Firm* — Osha Liang LLP

(57) ABSTRACT

A piston for a four valve direct injection diesel engine defines a combustion chamber comprising a recess (10) in the piston crown, which is rotationally symmetrical about the axis of the piston in axial cross-section and is defined by a base and a side wall. A generally conical projection (5) is upstanding from the base. The recess (10) includes a lower toroidal portion (8) and an upper portion (10), whose diameter progressively increases towards the piston crown. The upper and lower portions of the recess are separated by an annular, arcuate lip (12) extending into the recess. The included angle of the conical projection (5) is between 104° and 108°, the maximum depth of the recess (10) is between 13% and 22% of the diameter of the piston, the conical projection (5) merges with the base of the recess along a circular line whose diameter is between 38% and 44% of the diameter of the piston, the diameter of the lip (12) is between 54% and 59% of the diameter of the piston, the line of minimum diameter of the lip (12) is situated at a distance between 5% and 10% of the diameter of the piston from the plane of the piston crown and the diameter of the upper portion (10) of the recess increases from 54% to 59% of the diameter of the piston at the line of minimum diameter of the lip to between 72% and 76% of the diameter of the piston at the line where the side wall of the recess intersects the plane of the piston crown.

3 Claims, 2 Drawing Sheets

(56) References Cited

U.S. PATENT DOCUMENTS

Figure 1:
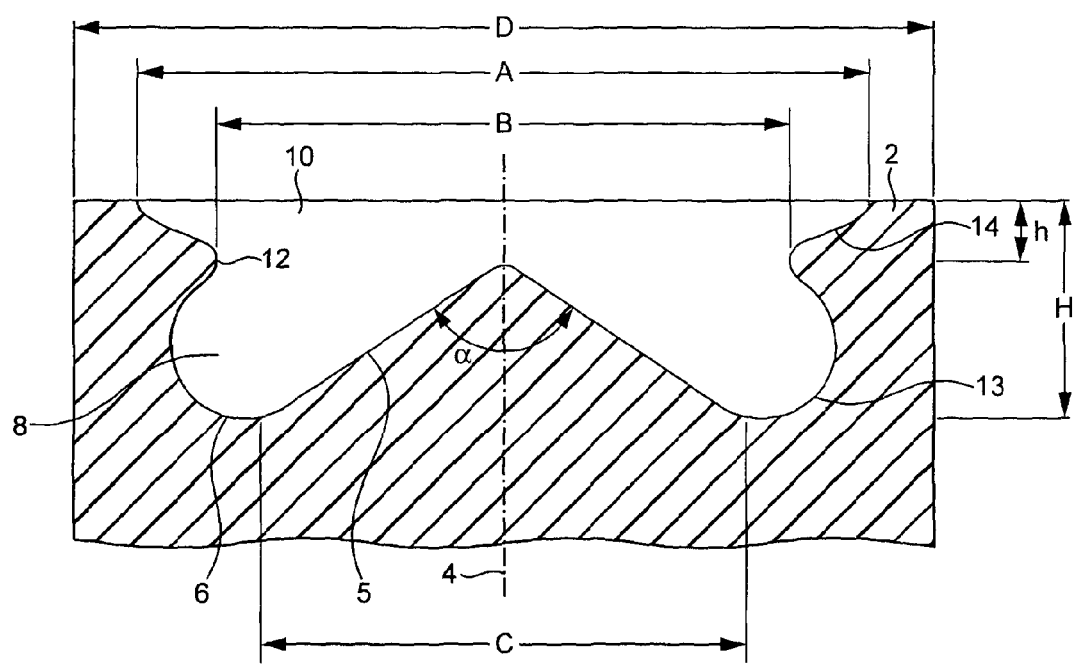

| | | | |
|---|---|---|---|
| 6,732,703 B2 | 5/2004 | Eckerle et al. | |
| 6,799,551 B2* | 10/2004 | Nakakita et al. | 123/295 |
| 6,892,695 B2* | 5/2005 | Schmitz et al. | 123/295 |
| 6,997,158 B1 | 2/2006 | Liu | |
| 7,210,448 B2 | 5/2007 | Stanton et al. | |
| 7,458,358 B2* | 12/2008 | Lineton et al. | 123/193.6 |
| 7,640,094 B2* | 12/2009 | Ishikawa et al. | 701/105 |
| 7,918,206 B2* | 4/2011 | Eismark et al. | 123/298 |
| 8,156,927 B2* | 4/2012 | Iikubo et al. | 123/661 |
| 8,276,563 B2* | 10/2012 | Quigley et al. | 123/274 |
| 2003/0051694 A1* | 3/2003 | Gaiser et al. | 123/193.6 |
| 2005/0172926 A1* | 8/2005 | Poola et al. | 123/193.6 |
| 2007/0079775 A1* | 4/2007 | Lin et al. | 123/41.35 |
| 2008/0121205 A1* | 5/2008 | Scharp | 123/193.6 |
| 2009/0007879 A1* | 1/2009 | Hutmacher | 123/193.6 |
| 2009/0145394 A1* | 6/2009 | Nigro et al. | 123/193.6 |
| 2009/0165743 A1* | 7/2009 | Kemnitz et al. | 123/193.6 |
| 2009/0217905 A1* | 9/2009 | Tanaka et al. | 123/276 |
| 2010/0071653 A1* | 3/2010 | Lohmann | 123/193.6 |
| 2011/0048364 A1* | 3/2011 | Besson et al. | 123/193.6 |
| 2011/0253096 A1* | 10/2011 | Easley et al. | 123/294 |
| 2012/0037112 A1* | 2/2012 | Muscas | 123/193.6 |
| 2012/0192828 A1* | 8/2012 | Schulz et al. | 123/193.6 |
| 2012/0234285 A1* | 9/2012 | Venugopal et al. | 123/193.6 |

FOREIGN PATENT DOCUMENTS

| | | |
|---|---|---|
| EP | 0 945 602 A2 | 9/1999 |
| WO | 2004/057167 A1 | 7/2004 |

OTHER PUBLICATIONS

Written Opinion from PCT/GB2011/000095 dated May 31, 2011 (4 pages).

* cited by examiner

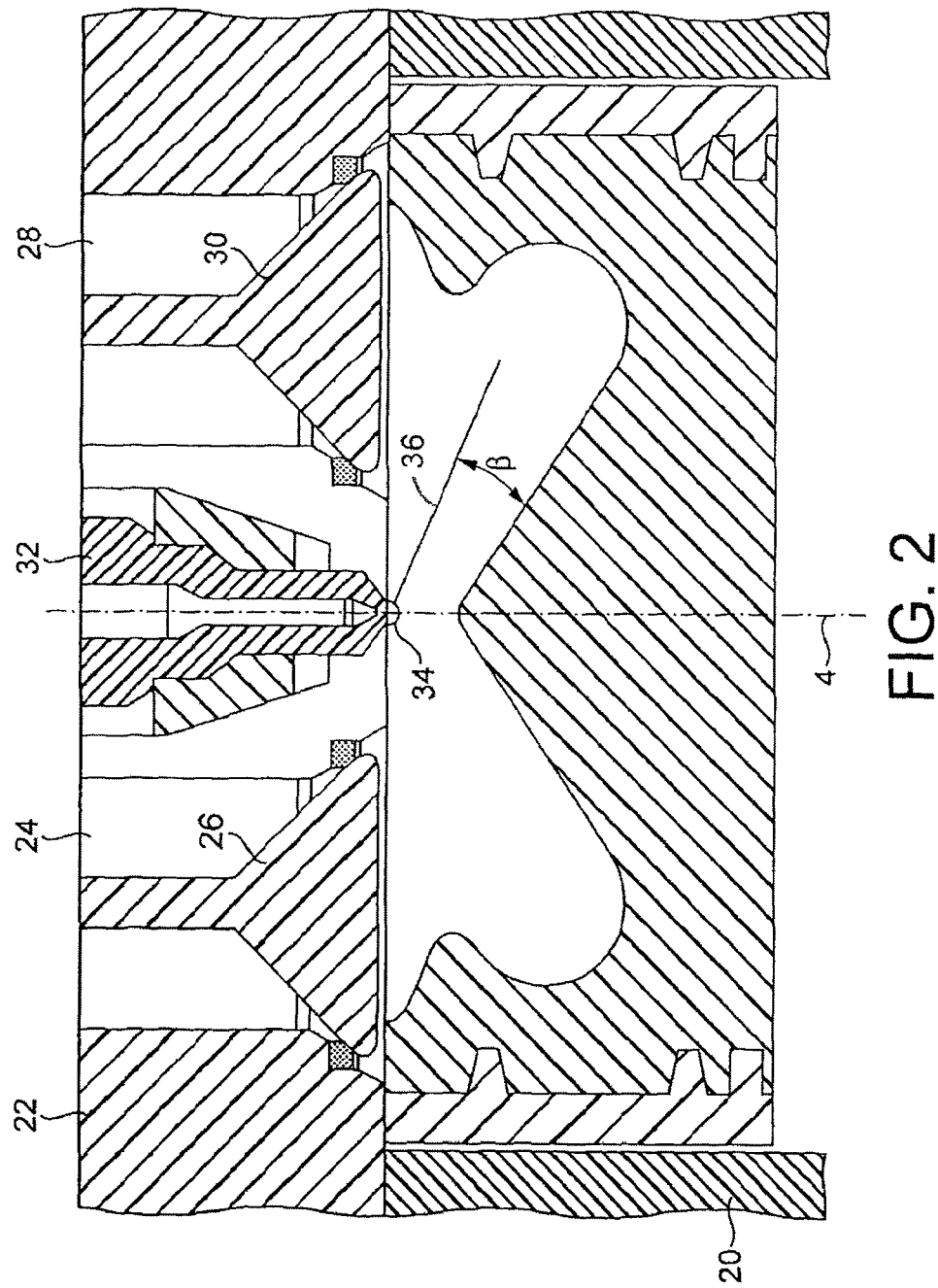

DIRECT INJECTION DIESEL ENGINES

The present invention relates to direct injection diesel engines of the type with four valves per cylinder, that is to say two inlet valves and two exhaust valves.

One of the most important considerations when designing a diesel engine is its level of emissions, particularly of unburnt hydrocarbons, nitrogen oxides ($NO_x$) and sooty particulates and increasingly stringent emissions legislation is driving engine developers to ever greater efforts to reduce engine emissions in the most cost-effective way possible. It is generally preferred in this connection to focus on engine-based measures in order to avoid both the capital and running costs associated with exhaust gas after-treatment systems, such as catalyst and filtration systems.

In a diesel engine, the shape of the combustion chamber and its interaction with the fuel injection system are of critical importance in reducing emissions. The combustion chamber of direct injection diesel engines is generally located in the crown of the piston. Engines with two valves per cylinder, i.e. one inlet valve and one exhaust valve, necessarily have the fuel injector offset from and inclined to the axis of the cylinder and piston and this means that the combustion chamber in the piston crown must be similarly offset in order that it is positioned generally below the fuel injector. Such an offset combustion chamber has a negative impact on both the emissions and the fuel economy of the engine due to the fact that the swirling motion of the fuel/air mixture within the chamber is not uniform about the axis of the cylinder and the fact that the lengths of the spray paths of the fuel from the different injection orifices in the fuel injector are generally unequal. For this reason direct injection diesel engines with four valves per cylinder are generally preferred because this permits the combustion chamber to be positioned coaxially and the fuel injector to be positioned and orientated coaxially also.

Many different shapes are known for the combustion chamber of four valve direct injection diesel engines but some of them are of generally ω shape in axial cross-section and this is the shape of the combustion chamber with which the present invention is concerned. More specifically, the invention is concerned with that type of piston in which the recess constituting the combustion chamber is rotationally symmetrical about the axis of the piston in axial cross-section and defined by a base and a side wall, a substantially conical or frusto-conical projection upstanding from the base, the recess including a lower toroidal portion furthest from the piston crown and an upper portion closest to the piston crown whose diameter progressively increases towards the piston crown, the upper and lower portions being separated by an annular lip of arcuate shape in axial cross-section extending into the recess.

A piston of this general type is disclosed in DongFeng Chinese Patent Application No. 2010745567. However, this piston is intended for use in two valve direct injection engines, and the combustion chamber is thus positioned eccentrically in the piston crown and this is in any event disadvantageous for the reasons discussed above. However, even if the combustion chamber disclosed in this document were positioned centrally in the piston crown, thus making the piston inherently suitable for use in a four valve diesel engine, it is believed that the mixing of the fuel and air would be insufficiently complete and that the level of emissions, e.g. unburnt hydrocarbons, $NO_x$ and sooty particulates, would be unacceptably high.

A further piston of generally similar type is disclosed in U.S. Pat. No. 7,210,448 B2 and U.S. Pat. No. 6,732,703 B2, but in both of these patents there is no annular lip and thus no identifiable division between the upper and lower portions of the recess. The mixing of the air and fuel is believed to be less than optimum in these combustion chambers also and it is believed that the levels of pollutant emissions are again not as low as desirable. Furthermore, it is found that the fuel/air mixture comes into contact with the cylinder wall to a significant extent which results in dilution of the lubricating oil on the cylinder wall by the fuel, thereby resulting in a reduced service life of the engine.

As mentioned above, the level of production of sooty particles is believed to be unacceptably high in the combustion chamber of all of the prior documents referred to above. This represents incomplete combustion of the fuel and thus inefficiency and furthermore the emission of soot particles to the atmosphere can only be reduced to an acceptable or legally permissible level by expensive after treatment, such as filtration. The soot or partially burnt hydrocarbon particles are surprisingly hard and thus abrasive and it is found in practice that in the combustion systems of the prior documents an unacceptably high proportion of the soot particles comes into contact with the cylinder wall and become trapped or entrained in the layer of oil that is present on that wall. The oil and entrained particles subsequently return to the main oil circuit of the engine where the abrasive particles cause significant damage in the long term to the oil pump and other components to which the oil is supplied, thereby increasing the maintenance cost of the engine and/or reducing its service life.

It is therefore the object of the invention to provide a four valve direct injection diesel engine and a piston for such an engine in which the fuel/air mixture is mixed more intensively and thoroughly than previously, thereby resulting in a decrease in emissions and an increase in engine efficiency. It is a further object of the invention not only to reduce the amount of sooty particulates that are produced but also to reduce the proportion of those particulates which become entrained in the layer of oil on the cylinder wall and thereby to reduce the maintenance cost and increase the service life of the engine.

According to the present invention, a piston for a four valve direct injection diesel engine of the type referred to above is characterised in that the included angle of the conical or frusto-conical projection is between 104° and 108°, that the maximum depth of the recess from the base to the plane of the piston crown is between 13 and 22%, preferably between 18 and 22%, of the diameter of the piston, that the conical or frusto-conical projection merges with the base along a circular line whose diameter is between 38 and 44%, preferably between 38 and 42%, of the diameter of the piston, that the diameter of the lip is between 54 and 59% of the diameter of the piston, that the line of minimum diameter of the lip is situated at a distance of between 5 and 10% of the diameter of the piston from the plane of the piston crown and that the diameter of the upper portion of the recess increases from 54 to 59% of the diameter of the piston at the line of minimum diameter of the lip to between 72 and 76% of the diameter of the piston at the line where the side wall of the recess intersects the plane of the piston crown.

The numerous dimensional parameters of the combustion chamber all have an effect on the intensity and thoroughness of the mixing of the air and fuel and thus on the efficiency and emissions of the engine and it is therefore necessary to optimise all of the parameters with respect to one another and exhaustive testing has indicated that the dimensional ranges referred to above represent the optimum and that significantly lower emissions are produced and higher efficiency achieved. The greatest difference with respect to the known combustion chambers referred to above reside in the fact that the annular lip is significantly larger, that is to say projects further into the combustion chamber and results in a more marked separation of the combustion chamber into upper and lower portions. The inlet valves of four valve direct injection diesel engines are generally of the type which are constructed and arranged to produce swirl of the inflowing air within the combustion chamber substantially about the axis of the cylinder and it is believed that the larger annular lip results in a longer residence time of the swirling air and fuel in the lower portion of the combustion chamber below the lip and thus also in more thorough mixing of the air and fuel before it moves upwardly into the upper portion of the combustion chamber and subsequently into the upper portion of the cylinder after the piston has moved away from the top dead centre position. The larger annular lip also results in the air/fuel mixture flowing out of the lower portion of the combustion chamber being given a radially inward component of motion and this means that a smaller portion of the burning mixture impinges against the relatively cool cylinder wall. This reduces the extent to which the fuel/air mixture comes into contact with the cylinder wall and this in turn results in a reduction in the dilution of the lubricating oil on the cylinder wall by the fuel. The larger annular lip also reduces the proportion of the burning mixture which is subjected to quenching or rapid cooling by contact with the cylinder wall and this in turn results in reduced generation of $NO_x$. The more thorough mixing of the air and fuel results in more complete combustion and thus in reduced emissions of unburnt hydrocarbons, in particular sooty particulates. Thus not only are fewer sooty particulates produced but, as a result primarily of the larger annular lip, a smaller proportion of them is entrained in the oil layer on the surface of the cylinder wall.

It is preferred that portion of the side wall which defines the upper portion of the recess is concave in axial cross-section. It is found that this concavity additionally promotes the movement of the burning fuel/air mixture in a generally axial direction and not into contact with the cylinder wall where it would be locally quenched by the relatively low temperature of the cylinder wall and this further reduces the proportion of soot particles which become entrained in the layer of oil on the cylinder wall.

The present invention also embraces a direct injection diesel engine including a cylinder block defining at least one cylinder which is closed by a cylinder head and reciprocably receives a respective piston of the type referred to above, the cylinder communicating with two inlet valves and two exhaust valves in the cylinder head, the inlet valves being of the type arranged to induce swirl of the inflowing air in the cylinder substantially about the cylinder axis, the cylinder head additionally carrying a fuel injector which is situated substantially on the cylinder axis and includes a plurality of fuel injection orifices, the orifices being so arranged that the fuel jets through them extend at an angle which diverges from the surface of the projection by 15 to 19°, whereby the fuel jets impinge firstly on the arcuate side wall of the lower portion of the recess.

It is found that orientating the injector orifices such that the fuel jets emitted by them diverge from the adjacent inclined surface of the projection further enhances the efficiency of the engine and further reduces the emission of pollutants and the entrainment of sooty particulates in the oil on the wall of the cylinder. The invention is not limited to any particular reason as to why this should be so but the reason is thought to be as follows:

It is usual in engines of this type for the fuel injector orifices to be oriented such that the fuel jets impinge initially on the conical surface of the projection. The jets bounce off the conical surface and then move either directly out of the combustion chamber or, more usually, into contact with the lower portion of the arcuate side wall of the lower toroidal portion of the combustion chamber. The jets are then inherently deflected upwards, that is to say towards the piston crown and then flow, at least for the most part, out of the combustion chamber into the cylinder. The fuel thus swirls briefly in the combustion chamber about an axis which extends in the tangential direction substantially perpendicular to the cylinder axis. It will be appreciated that this swirling motion is superimposed on the swirling motion about the cylinder axis which is induced by the inlet ports. The residence time of the fuel in the combustion chamber is therefore relatively brief. However, in the engine in accordance with the invention, the direction of the fuel jets is rotated through some 20 to 40° and their direction diverges from the adjacent surface of the projection. This means that they inherently impinge firstly on the upper portion of the curved side wall of the lower toroidal portion of the recess and the curvature of this is inherently such that the fuel jets are deflected downwardly, that is to say away from the piston crown and not towards it. This means that the secondary swirling motion of the fuel about axes perpendicular to the cylinder axis is in the opposite sense to that in the known engines. This inherently results in the distance covered by the fuel in its secondary swirling motion being increased and thus that the residence time of the fuel in the lower portion of the combustion chamber is increased also. This inherently results in the mixing and vaporisation of the fuel being improved, whereby the production of pollutants and soot particles is reduced. Furthermore, as mentioned above, the reduced number of soot particles are directed by the annular lip away from the cylinder wall so that a reduced proportion of them becomes entrained in the engine oil.

Further features and details of the present invention will be apparent from the following description of one specific four valve direct injection diesel engine in accordance with the invention which is given by way of example only with reference to the accompanying diagrammatic drawings, in which:

FIG. 1 is an axial sectional view of the upper portion of a piston in accordance with the invention; and FIG. 2 is a sectional view through a portion of a four valve direct injection multi-cylinder diesel engine showing only the upper portion of one cylinder and of the piston within it at the top dead centre position and a portion of the associated cylinder head.

The piston shown in FIG. 1 is of generally conventional shape and has a substantially flat upper surface or crown 2. Formed in the piston crown 2 is a recess which is rotationally symmetrical with respect to the axis 4 of the piston and constitutes a combustion chamber. The recess is defined, in axial cross-section, by a base 6, a side wall, which is divided into two portions as will be described below, and a coaxial, substantially conical projection 5 upstanding from the base. The recess is of generally ω shape and comprises a lower toroidal portion 8, which is furthest from the piston crown 2, and an upper portion 10 closest to the piston crown, whose diameter progressively increases towards the piston crown. The upper and lower portions 6 and 10 are separated by an annular lip 12 of arcuate contour in cross-section, which projects into the combustion chamber. The arcuate shape of the lip merges smoothly into the upper portion 14 of the side wall, which defines the upper portion 10 of the recess and also merges smoothly into the arcuate lower portion 13 of the side wall, which defines the lower toroidal portion 8 of the recess. The diameter D of the piston is 103 mm in this specific embodiment. The maximum diameter A of the upper portion 10 of the recess at the circular line at which it merges with the crown 2 is between 0.72 and 0.76 D and in this specific embodiment is 76 mm. The minimum diameter B of the arcuate annular lip 12, that is to say its diameter at its crest or apex is between 0.54 and 0.58 D and in the specific embodiment is 58 mm. The external surface of the projection 5 is linear in cross-section and merges with the base 6 at a circular line whose diameter C is between 0.38 and 0.42 D. The maximum depth H of the recess, that is to say the distance between the plane of the crown 2 and the deepest point of the recess is between 0.18 and 0.22 D and in the specific embodiment is 19.6 mm. The depth h of the upper portion 10 of the recess, that is to say the distance between the plane of the crown 2 and the crest of the arcuate recess 12 is between 0.06 and 0.10 D and in the specific embodiment is 6.63 mm. The included angle α of the conical projection 5 is between 104 and 108°. The portion 14 of the side wall of the recess defining its upper portion 10 is concave in axial cross-section.

FIG. 2 shows the piston schematically illustrated in FIG. 1 in position in one cylinder of a multicylinder direct injection diesel engine. The engine includes a cylinder block 20 defining the cylinders, all of which are closed by a cylinder head 22. The cylinder head 22 defines two inlet passages 24, of which only one is visible, controlled by an inlet valve 26 in the usual manner. The inlet ducts 24 and inlet valves 26 are constructed in a known manner to induce the inlet air admitted through them to swirl within the cylinder and the combustion chamber constituted by the recess in the piston crown substantially about the axis 4 of the piston and cylinder. The cylinder head also defines two exhaust passages 28, of which only one may be seen, which is controlled in the conventional manner by an exhaust valve 30. Also accommodated within the cylinder head 22 is a fuel injector 34 which is arranged parallel to and coaxial with the axis 4 of the cylinder. The fuel injector 32 terminates in a tip 34, which is positioned very slightly below the plane of the underside of the cylinder head and thus extends slightly into the recess in the piston, when the piston is in the top dead centre position, as illustrated in FIG. 2. Formed in the tip 34 of the fuel injector is a plurality of fuel injection orifices, which are positioned to discharge individual jets of fuel at an angle which is inclined by an angle β of between 15 and 19° to the surface of the conical projection 5.

In use, the fuel injector is operated to inject fuel through the fuel injector orifices into the recess in the piston crown when the piston is at or very close to the top dead centre position. The air admitted through the inlet passages 24 swirls rapidly about the axis 4 within the combustion chamber and the jets of fuel 36 injected into the combustion chamber are injected at an angle which diverges from the surface of the projection 5. These jets therefore do not impinge directly on the surface of the projection 5 but instead impinge on the arcuate portion of the side wall of the recess which defines the lower toroidal portion 8 of the recess. The curvature of this portion of the side wall and the angle of incidence of the fuel jet on it is such that the fuel jet is deflected downwardly, that is to say towards the base of the recess and the fuel is therefore caused to swirl in the clockwise direction as seen on the right-hand side of FIGS. 1 and 2 whilst also of course being caused to swirl additionally about the axis 4. The fuel therefore swirls downwardly along the lower portion of the side wall of the recess and then generally horizontally inwardly along the base of the recess before turning to move upwardly, as shown schematically by the arrow on the right-hand side in FIG. 2. The fuel therefore has an extended residence time within the combustion chamber and this fact coupled with the optimisation of the dimensional parameters of the combustion chamber results in extremely efficient mixing of the fuel and air, whereby combustion is substantially complete and thus very efficient and the amount of unburnt hydrocarbons is minimised and the generation of soot particles is thus minimised also. The burning fuel and air mixture then leaves the combustion chamber and enters the upper portion of the cylinder, which is now accessible due to the fact that the piston has moved downwardly away from the top dead centre position illustrated in FIG. 2. However, the protrusion of the annular lip 12 into the combustion chamber coupled with the concave shape of the portion 14 of the side wall means that the burning fuel/air mixture leaving the combustion chamber does so in a substantially vertically extending column which comes into contact only slightly with the side wall of the cylinder, thereby minimising localised quenching of the burning fuel/air mixture on the cylinder walls, which in turn minimises the generation of $NO_x$. Furthermore, the fact that the burning fuel/air mixture scarcely comes into contact with the cylinder wall means that only a small proportion of the reduced amount of soot particles that are produced become entrained in the layer of oil coating the cylinder wall.

The invention claimed is:
1. A direct injection diesel engine including:
a cylinder block defining at least one cylinder which is closed by a cylinder head and reciprocally receives a respective piston, the piston defining a combustion chamber comprising:
    a recess formed in a piston crown, the recess being rotationally symmetrical about an axis of the piston in axial cross-section and defined by a base and a side wall,
    a substantially conical or frusto-conical projection upstanding from the base, the recess including a lower toroidal portion furthest from the piston crown and an upper portion closest to the piston crown whose diameter progressively increases towards the piston crown,
    the upper and lower portions being separated by an annular lip of arcuate shape in axial cross-section extending into the recess,
    an included angle of the conical or frusto-conical projection between 104° and 108°,
    the maximum depth of the recess from the base to a plane of the piston crown between 13 and 22% of a diameter of the piston,
    the substantially conical or frusto-conical projection merging with the base along a circular line whose diameter is between 38 and 44% of the diameter of the piston,
    a diameter of the annular lip between 54 and 59% of the diameter of the piston,
    a line of minimum diameter of the annular lip situated at a distance of between 5 and 10% of the diameter of the piston from the plane of the piston crown, and
    a diameter of the upper portion of the recess increasing from 54 to 59% of the diameter of the piston at the line of minimum diameter of the annular lip to between 72 and 76% of the diameter of the piston at the line,
    the side wall of the recess intersecting the plane of the piston crown,
wherein the cylinder head includes a fuel injector which is situated substantially on the cylinder axis and includes a plurality of fuel injection orifices,
wherein the cylinder is configured to communicate with two inlet valves and two exhaust valves in the cylinder head, wherein the inlet valves are arranged to induce swirl of the inflowing air in the cylinder substantially about the cylinder axis, wherein the fuel injection orifices are arranged so that the fuel jets through them extend at an angle which diverges from the surface of the projection by 15 to 19°, and wherein the fuel jets impinge firstly on the arcuate side wall of the lower portion of the recess.

2. The engine as claimed in claim 1, wherein the included angle of the substantially conical or frusto-conical projection is substantially 106°.

3. The engine as claimed in claim 1, wherein a portion of the side wall which defines the upper portion of the recess is concave in axial cross-section.

* * * * *